Figure 1:
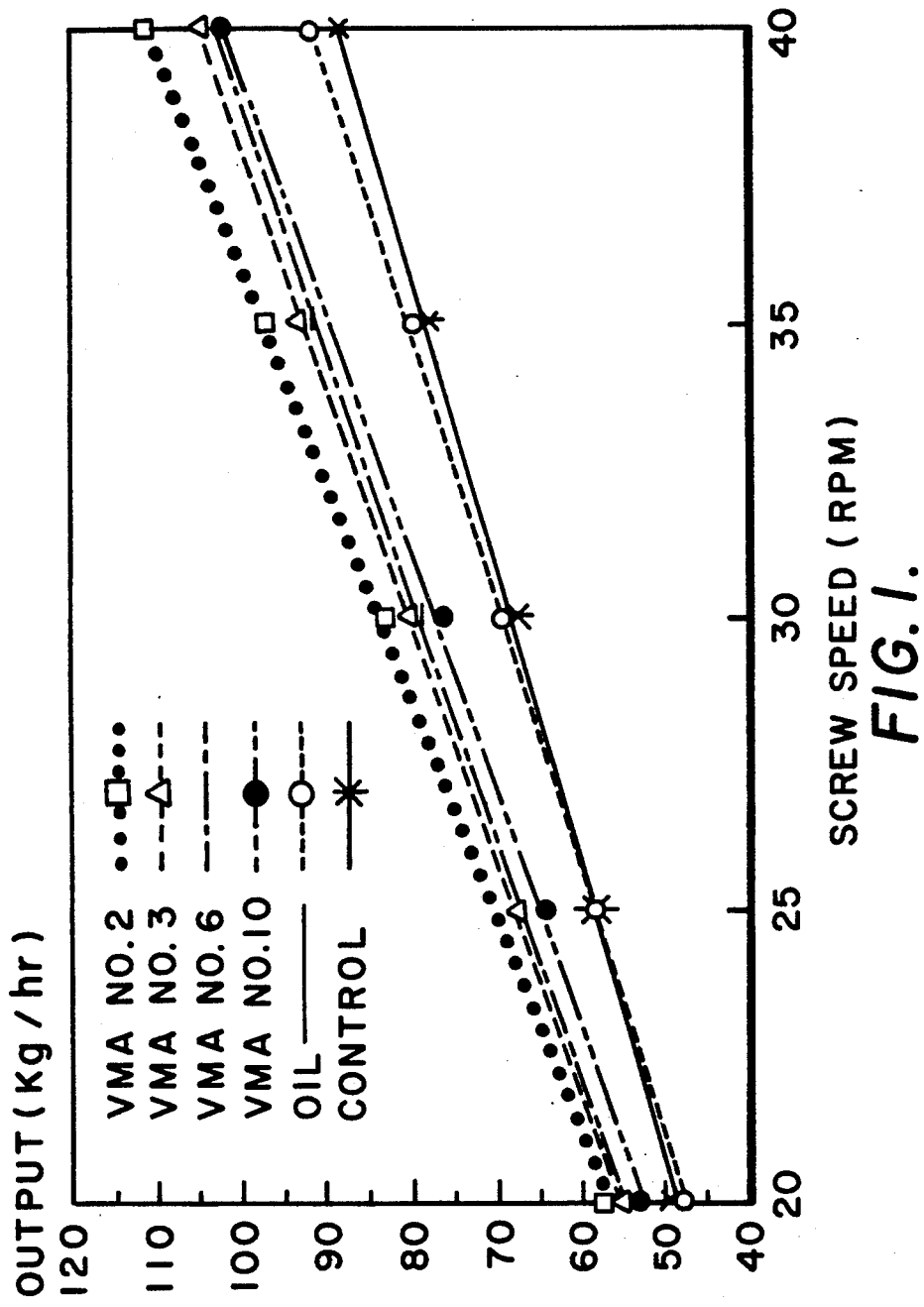

United States Patent [19]

Lynch

[11] Patent Number: 5,023,289

[45] Date of Patent: Jun. 11, 1991

[54] RUBBER COMPOSITIONS HAVING IMPROVED PROCESSABILITY

[75] Inventor: Eric R. Lynch, Brussels, Belgium

[73] Assignee: Monsanto Europe, S.A., Brussels, Belgium

[21] Appl. No.: 528,410

[22] Filed: May 25, 1990

[30] Foreign Application Priority Data

Jun. 2, 1989 [GB] United Kingdom ............... 89 12718

[51] Int. Cl.$^5$ ................................................ C08K 5/36
[52] U.S. Cl. .................................................... 524/302
[58] Field of Search ......................................... 524/302

[56] References Cited

U.S. PATENT DOCUMENTS 2,429,858 10/1947 Vincent et al. ..................... 524/285

FOREIGN PATENT DOCUMENTS 45-6954 10/1970 Japan.

*Primary Examiner*—Joseph L. Schofer
*Assistant Examiner*—Peter D. Mulcahy
*Attorney, Agent, or Firm*—Gordon B. Seward

[57] ABSTRACT

Alkylthioalkanoic acids, salts or esters having the formula $$R^1S(CR^3R^4)_xCO_2R^2$$

where $R^1$ represents an alkyl or alkenyl group, or a hydroxy- or alkoxy-substituted alkyl or alkenyl group, said group containing (apart from the alkoxy carbon atoms in an alkoxy-substituted alkyl or alkenyl group) from 4 to 22 carbon atoms, $R^2$ represents hydrogen, a metallic or other cationic group, or an esterifying group, each of $R^3$ and $R^4$ represents independently hydrogen or an alkyl group, and x has a value of from 1 to 10, act as viscosity-modifying agents in unvulcanized rubber compositions. Compared with conventional processing aids, they improve the processing characteristics of unvulcanized rubber compositions and can have beneficial effect on the physical properties of vulcanisates obtained by the vulcanization of such compositions.

12 Claims, 2 Drawing Sheets

RUBBER COMPOSITIONS HAVING IMPROVED PROCESSABILITY

This invention relates rubber compositions having improved processability.

The mixing of rubber with other ingredients such as are required to give a composition which is vulcanisable on heating, is a process with a high energy consumption, and typically an ingredient having the effect of reducing the viscosity of the rubber compound is included. A reduction in viscosity means that for a given degree of mixing the power consumption is reduced, the throughput rate of the mixing equipment is increased, and the maximum temperature which the compound attains is reduced. Similar considerations apply to other processing operations such as the calendaring, extrusion or injection moulding of rubber compounds. Here, the avoidance of high temperatures which would dispose the compound to scorching, is especially important.

Against these beneficial effects of processability aids has to be offset the fact that most materials currently used for this purpose, for example rubber-compatible hydrocarbon oils, tend to have a modulus- and hardness-reducing effect on the vulcanisate. The amount which can be added to improve the processability of the compound before vulcanisation is therefore limited. There is therefore a need for materials which could be added to rubber to improve processability without adversely affecting other physical properties such as the mechanical properties of vulcanisates.

Among other additives for rubber which have been proposed are "reactive plasticisers" disclosed in Japanese Patent Publication No. 45 (1970)-6,954. These are high-boiling petroleum fractions or unsaturated animal or vegetable oils modified by the introduction of functional groups, for example groups derived from thioglycollic acid. U.S. Pat. No. 2,429,858 discloses a method of improving the processability of butadiene-styrene elastomers by the incorporation therein of a terpene thioether of an alphamercaptocarboxylic acid or a metal salt of such an acid. It is shown in U.S. Pat. No. 2,429,858 that the use of the terpene thioethers permits a significant reduction in the milling time, but no data on the properties of the vulcanisates are given.

We have now found that certain alkylthiocarboxylic acids as defined below and hereinafter referred to as viscosity modifying agents (VMA's), have advantages over the processing aids of the prior art.

In particular, the use of the VMA's according to the invention gives rubber compounds having processability characteristics which are generally better than those of rubber compounds containing the same weight of a conventional process oil, while vulcanisates obtained by vulcanising compounds containing VMA's have improved physical properties, especially improved resilience, hardness and compression set, relative to compounds containing conventional process oil. Furthermore, data given below demonstrate improvements relative to the thioethers of the prior art that can be obtained with VMA's according to the present invention.

The present invention provides a rubber composition comprising an unvulcanised rubber polymer and, as a viscosity modifying additive, an alkylthioalkanoic acid, salt or ester having the formula $$R^1S(CR^3R^4)_xCO_2R^2$$

where $R^1$ represents an alkyl or alkenyl group, or a hydroxy- or alkoxy-substituted alkyl or alkenyl group, said group containing (apart from the alkoxy carbon atoms in an alkoxy-substituted alkyl or alkenyl group) from 4 to 22 carbon atoms, $R^2$ represents hydrogen, a metallic or other cationic group, or an esterifying group, each of $R^3$ and $R^4$ represents independently hydrogen or an alkyl group, and x has a value of from 1 to 10.

In another aspect, the invention provides a method of improving the processability of rubber, which comprises incorporating in the rubber an alkylthioalkanoic acid, salt or ester as defined above.

In the above formula of the VMA, $R^1$ can in principle be any straight or branched chain alkyl or alkenyl group having from 4 to 22 carbon atoms, for example straight-chain butyl, pentyl, hexyl, heptyl, octyl, octenyl, nonyl, decyl, dodecyl, dodecenyl, tetradecyl, hexadecyl, or octadecyl, or any of the branched-chain isomers thereof. A hydroxy- or alkoxy-substituted alkyl or alkenyl group can contain one or more such substituents, normally one or two. An alkoxy substituent is preferably one containing from 1 to 4 carbon atoms, for example methoxy or ethoxy.

Where $R^2$ represents a metallic or other cationic group, this can be for instance an alkali metal ion, for example sodium. $R^2$ can alternatively represent the equivalent of a multivalent metal, for instance magnesium, calcium, barium, zinc, nickel, cobalt, or aluminium. Of these, zinc is the preferred multivalent metal.

A cationic group $R^2$ can also be one derived from ammonia or an amine, for example an amine having the formula $R^5R^6NH$ where $R^5$ and $R^6$ each represent hydrogen, an alkyl group, a cycloalkyl group, a benzyl group or a phenyl group, provided that $R^5$ and $R^6$ are not simultaneously both hydrogen or both phenyl. Cationic groups $R^2$ may also be derived from other nitrogenous bases, for example guanidine or diphenylguanidine.

An esterifying group $R^2$ can be, for example, an $C_{1-18}$ straight- or branched-chain alkyl group, for example a methyl, ethyl or isopropyl group, a $C_{3-7}$ cycloalkyl group, for example cyclohexyl, or an alkyl $C_{3-7}$ cycloalkyl group containing a total of up to 10 carbon atoms, for example methylcyclohexyl, a benzyl group or a phenyl group.

When $R^3$ or $R^4$ represents an alkyl group, this is preferably a group containing from 1 to 6 carbon atoms, especially a methyl or ethyl group. Preferably at least one of $R^3$ and $R^4$ attached to the carbon atom in each group $CR^3R^4$ is hydrogen. Preferred compounds are those in which x has a value of from 1 to 4. Most preferred are compounds where $R^1$ represents a straight chain alkyl group of from 10 to 16 carbon atoms, $R^3$ represents hydrogen, $R^4$ represents hydrogen or a methyl group, and x has a value of 1 or 2.

Several methods are available for the preparation of alkylthioalkanoic acids useful in accordance with the invention. These include i) the reaction of an alpha-olefin $R^1CH=CH_2$ with thioglycollic acid. This gives alkylthioacetic acids $R^1CH_2CH_2SCH_2COOH$ or $R^1CH(CH_3)SCH_2CO_2H$ depending on the reaction conditions. Similarly the alpha-olefin with 3-mercaptopropionic acid should give $R^1CH_2CH_2SCH_2CH_2CO_2H$ or $R^1CH(CH_3)SCH_2CH_2CO_2H$, and with 2-mercaptopropionic acid $R^1CH_2CH_2SCH(CH_3)CO_2H$ or $R^1CH(CH_3)SCH(CH_3)CO_2H$ depending on the reaction conditions.

ii) the reaction of a mercaptan $R^1SH$ with a halogen-substituted alkanoic acid of the formula $$X(CR^3R^4)_xCO_2H$$

where X represents halogen, for example chlorine or bromine, and $R^3R^4$ and x have the same meanings as in the formula of the VMA above. This is a general method for the synthesis of a variety of alkylthioalkanoic acids.

iii) the reaction of acrylic acid with a mercaptan under basic conditions (this implies that the mercaptide anion makes a nucleophilic reaction with the C=C bond of the acrylate anion) which may be aqueous alkaline or an organic base in a solvent, gives rise specifically to 3-(alkylthio)propionic acids, i.e. $R^1SCH_2CH_2CO_2H$.

iv) the reaction of gamma-butyrolactone with a mercaptan $R^1SH$ or the corresponding alkali metal mercaptide under basic conditions. This method provides alkylthioalkanoic acids in which x has a value of 3.

The viscosity modifying agents described above are especially effective in compositions in which the rubber is cis-polyisoprene, either natural or synthetic, but they are also useful with other rubbers, including for example poly-1,3-butadiene, copolymers of 1,3-butadiene with other monomers, for example styrene, acrylonitrile, isobutylene and methyl methacrylate, ethylene-propylenediene terpolymers, and halogen-containing rubbers such as chlorobutyl, bromobutyl and chloroprene rubbers. In other instances, the rubber polymer in a rubber composition of the invention can be a blend of two or more of the rubbers exemplified above, for example a blend of natural rubber and styrene-butadiene rubber.

The amount of VMA in a composition of the invention will vary depending on the nature of the rubber polymer, the degree of viscosity modification required, and whether or not other processing aids such as process oils are included. Usually however, the amount of VMA will be within the range from 0.5 to 10 parts by weight of rubber, and more especially within the range from 1 to 5 parts by weight per 100 parts by weight of rubber.

The VMA's can be used to improve the processability of raw rubber polymer, but are particularly useful in fully compounded rubber stocks containing a reinforcing agent and/or a filler, a vulcanising agent and an accelerator. Conventionally used fillers include carbon black, for example a carbon black of the N300 series such as N347 or N326, which typically is used in an amount of from 40 to 70 parts by weight per 100 parts by weight of rubber. Other additives include, for example, zinc oxide, which may be used in an amount of, for instance, from 2 to 10 parts by weight per 100 parts by weight of rubber; stearic acid at a level of, for instance, from 0.5 to 2 parts by weight per 100 parts by weight of rubber (although a feature of the present invention is that in compositions containing VMA's which are alkylthioalkanoic acids or salts the amount of stearic acid can be significantly reduced or it may not be needed at all); antidegradants, for example N-alkyl-N'-phenyl-p-phenylenediamines; and antioxidants, for example polymers of 2,2,4-trimethyl-1,2- dihydroquinoline. Other reinforcing agents and/or fillers may be used, for example silica, and the rubber stocks may also contain metal oxide activators other than zinc oxide, for example magnesium oxide, pre-vulcanisation inhibitors, for instance N-cyclohexylthiophthalimide, and post-vulcanisation stabilisers and rubber-metal bonding promoters, for example the thiosulphate derivatives described in EP-B-0 070 143 and EP-B-109 955.

The VMA can be incorporated into the rubber, together with additives except vulcanising agent and vulcanisation accelerator during a first stage mixing, using, for example, an internal mixer or a mill. In the processing of natural rubber it is customary to subject the raw rubber to a mastication before the introduction of any additives. By means of the VMA's of the invention, however, the reduction in the viscosity of the rubber achieved by mastication is accelerated if the VMA is added alone during the primary mastication stage, and for natural rubber, this is preferred. In an alternative procedure, the VMA can be incorporated along with the vulcanising agent and accelerator during a second stage mixing. If sulphur is used as the vulcanising agent, the amount is typically in the range from 2 to 6 parts by weight per 100 parts by weight of rubber.

Accelerators which can be used include the benzothiazole-2-sulphenamides, for instance N-isopropyl-benzothiazole-2-sulphenamide, N-tert-butyl-benzothiazole-2-sulphenamide, N-cyclobenzothiazole-2-sulphenamide, N,N-dicyclohexylbenzothiazole-2-sulphenamide and 2(morpholinothio)benzothiazole. In the compositions of the invention, these are typically used in amounts of from 0.3 to 2 parts by weight per 100 parts by weight of rubber depending on the nature of the rubber, the amount of sulphur, and the mechanical properties required in the cured rubber.

As indicated above, the VMA's used in this invention can be incorporated into the rubber by conventional mixing procedures. Most of the VMA's are liquids or low melting solids, and with these no special precautions are necessary for obtaining good dispersions. If necessary, higher melting solids could be ground to a fine powder, preferably 70 micrometre particle size or less, to promote adequate dispersion. In certain instances, it is convenient to add a solid VMA as a predispersion of particulate material in a rubber-compatible hydrocarbon oil or polymer, for example EPDM rubber.

The VMA's have been observed to have beneficial effects on certain physical properties of vulcanisates obtained by the vulcanisation of a composition of the invention which contains a filler, vulcanising agent and other ingredients conventionally used in the production of a fully compounded rubber stock. Such a vulcanisate represents a further aspect of the invention.

The invention is illustrated by the following specific embodiments.

For the evaluation of the VMA's of the invention, control stocks of the following composition were employed:

|  | Parts by weight |
|---|---|
| Natural rubber SMR 10 or SMR 20* | 100 |
| N 347 carbon black | 50 |
| Zinc Oxide | 5 |
| Stearic Acid | 2 |
| Process Oil | 3 |
| Antiozonant[1] | 2 |
| Sulphur | 2.5 |

-continued

| | Parts by weight |
|---|---|
| Accelerator[2] | 0.6 |

[1]N-1,3-dimethylbutyl-N'-phenyl-p-phenylenediamine
[2]N-Cyclohexylbenzothiazole-2-sulphenamide.
*Both were premasticated before the addition of other ingredients, SMR 10 to a viscosity of about 50 Mooney Units and SMR 20 to a viscosity of about 60 Mooney Units (ML (1 + 4) at 100° C.).

For mixing, a laboratory scale BR Banbury internal mixer was used. Ingredients were incorporated in accordance with the following schedule at intervals determined by the integral value of power consumption of the mixer. The premasticated rubber was loaded, the temperature of the mixer (water circulation) being 40° C.

| Power integral Value (kwh) | Operation |
|---|---|
| 0 | Add half of carbon black and zinc oxide to rubber. |
| 0.125 | Add remaining carbon black antiozonant, stearic acid, processing oil and (in test batches), VMA or prior art additive (3 parts by weight per 100 parts by weight of rubber). |
| 0.350 | Sweep, add sulphur and accelerator. |

Samples were vulcanised at 141° C. for resilience and hardness tests, the tests being performed in accordance with Standard procedures (ISO 4662 and ISO 48-1979(E) respectively).

Table 1 below gives results obtained with various stocks based on SMR 20 rubber and Table 2 gives results obtained with stocks based on SMR 10 rubber. The figures in parentheses (Rel) are percentages relative to the Control. The VMA's and prior art additives indicated by numbers in the left hand columns of the Tables are as follows:

1. None (Control)
2. n-Dodecylzhioacetic acid
3. 3-(n-Dodecylthio)propionic acid
4. Reaction product of alpha-pinene and thioglycollic acid (U.S. Pat. No. 2,429,858)
5. Zinc salt of reaction product 4.
6. t-Dodecylthioacetic acid, where "t-Dodecyl" denotes a group derived from propylene tetramer
7. n-Decylthioacetic acid
8. n-Hexadecylthioacetic acid
9. 2-(n-Dodecylthio)propionic acid.
9A. Zinc salt of n-dodecylthioacetic acid.

TABLE 1

| VMA | Mooney ML (1 + 4) 100° C. | | Mooney $t_5$ | | Rebound Resilience | | Hardness | |
| | Mooney Units | (Rel) | Min. | (Rel) | % | (Rel) | IRHD | (Rel) |
|---|---|---|---|---|---|---|---|---|
| 1 | 75.4 | (100) | 19.7 | (100) | 59.5 | (100) | 67 | (100) |
| 2 | 64.5 | (85) | 20.5 | (104) | 60.8 | (102) | 73 | (109) |
| 3 | 66.5 | (88) | 19.0 | (96) | 58.5 | (98) | 71 | (106) |
| 4 | 68.1 | (90) | 8.6 | (44) | 56.8 | (95) | 69 | (103) |
| 5 | 70.4 | (93) | 10.0 | (51) | 59.8 | (100) | 67 | (100) |

TABLE 2

| VMA | Mooney ML (1 + 4) 100° C. | | Mooney $t_5$ | | Rebound Resilience | | Hardness | |
| | Mooney Units | (Rel) | Min. | (Rel) | % | (Rel) | IRHD | (Rel) |
|---|---|---|---|---|---|---|---|---|
| 1 | 65.6 | (100) | 21.5 | (100) | 59.8 | (100) | 68 | (100) |
| 2 | 56.8 | (87) | 19.2 | (89) | 59.8 | (100) | 73 | (107) |
| 6 | 52.3 | (80) | 21.8 | (101) | 57.5 | (96) | 67 | (99) |
| 3 | 58.6 | (89) | 18.2 | (85) | 58.1 | (97) | 71 | (104) |
| 4 | 56.9 | (87) | 10.1 | (47) | 56.5 | (94) | 70 | (103) |
| 7 | 56.3 | (86) | 18.2 | (85) | 58.8 | (98) | 73 | (107) |
| 8 | 56.4 | (86) | 18.5 | (86) | 58.5 | (98) | 71 | (104) |
| 9 | 57.6 | (88) | 22.0 | (102) | 59.5 | (99) | 69 | (101) |
| 9A | 57.8 | (88) | 18.3 | (85) | 58.9 | (98) | 71 | (104) |

The above results permit a comparison of stocks containing a VMA of the invention with stocks containing an additive according to U.S. Pat. No. 2,429,858, each stock containing in addition a conventional process oil. The results show that stocks containing the prior art additives have much lower values for Mooney $t_5$. This is a measure of the induction period of the stock before the onset of cure. The lower the value of Mooney $t_5$, the greater the risk that the stock will scorch.

In Table 1, (SMR 20) such stocks are shown to have consistently lower values for resilience and hardness than stocks containing a VMA of the invention. The results of Table 2 (SMR 10) show an improvement for stocks according to the invention in respect of resilience.

Figure 2:
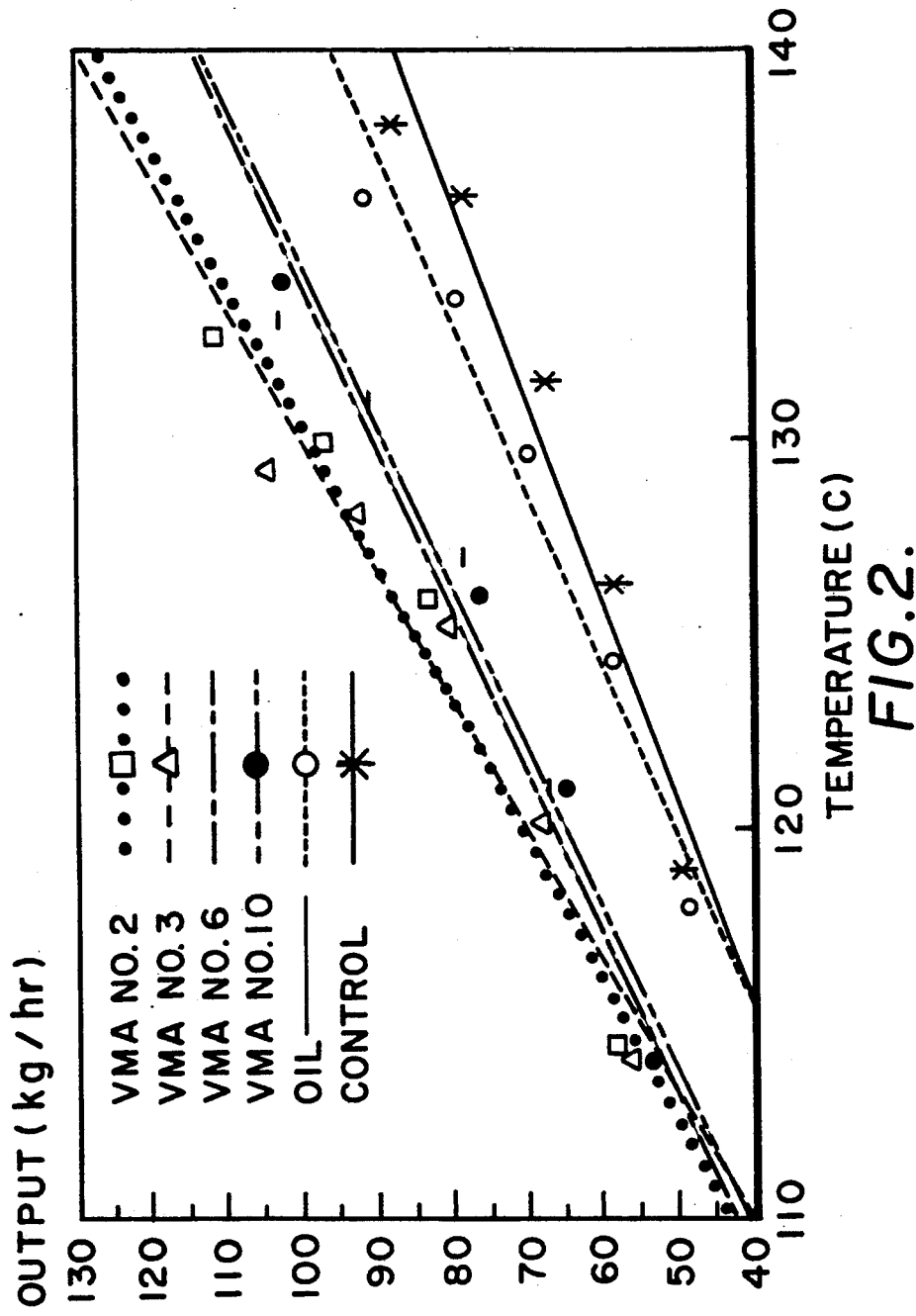

The results illustrated by FIGS. 1 and 2 provide a comparison of the processing behaviour of stocks containing a VMA of the invention with a stock containing a conventional processing aid (process oil) and with a stock without oil. The base stock was a typical compound based on SMR 10 natural rubber with 50 parts by weight of carbon black per 100 parts by weight of rubber, and amounts of zinc oxide, stearic acid, N-1,3-dimethyl-N'-phenyl-p-phenylenediamine antidegradant, sulphur and N-cyclohexylbenzothiazole-2-sulphenamide accelerator within conventional ranges. A Werner-Pfleiderer internal mixer having a capacity of 110 l was used for mixing. The components except the sulphur and accelerator were mixed during a first stage; then the sulphur and accelerator were incorporated during a second stage mixing.

Stocks containing additives for evaluation (process oil or VMA) were prepared similarly, 3 parts by weight of additive per 100 parts by weight of rubber being incorporated during the first stage mixing. The VMA's are numbered as indicated above in connection with Tables 1 and 2. VMA No. 10, not included in the Tables, was 3-(t-dodecylthio)propionic acid.

The effect of the additives on the processing of the stocks was assessed by measuring the output from an extruder at various screw speeds (FIG. 1) and also by measuring the temperature of the extrudate at various output rates (FIG. 2). The advantages of the VMA's over the conventional process oil are apparent from these results. FIG. 1 shows that the achievement of a given output from the extruder requires a lower screw speed and therefore a lower power input with the stocks containing VMA's. FIG. 2 shows that at a given screw speed, the temperature of the extrudate is lower for the stocks containing VMA's than for the comparative stock containing process oil and for the control stock without processing aid. This temperature differential is important because it shows that scorch should be less of a problem when extruding or injection moulding rubber stocks which contain a VMA. Conversely, at a given extrudate temperature, a higher output can be achieved with a stock containing a VMA than with a stock containing a comparable amount of conventional process oil.

FIGS. 1 and 2 suggest that the performance of VMA's where R is a straight-chain alkyl group is superior to that of VMA's where R is a branched chain alkyl group having the same number of carbon atoms.

Table 3 below gives results obtained with stocks similar to those which gave the results of Table 2 but using a different lot of SMR 10 rubber without process oil. The numbers in the left hand column of Table 3 correspond to the control stock and stocks containing various VMA and prior art additives, at 3 parts by weight per 100 parts by weight of rubber, as follows:
11. None (Control)
12. n-Dodecylthiobutyric acid
13. n-Octadecylthioacetic acid.
14. Reaction product of thioglycollic acid with a naphthenic process oil by the procedure of Japanese Patent publication No. 45 (1970) - 6954.
15. Reaction product of thioglycollic acid with tall oil by the procedure of Japanese Patent Publication No. 45 (1970) - 6954.

at 100% elongation than the control, the prior art additives gives stocks having lower values than the control.

Both the VMA's and the prior art additives had a beneficial effect on the processability, as measured by viscosity reduction, of the unvulcanised rubber stocks. With the VMA's, however, this effect is achieved without an adverse effect on the physical properties of the vulcanisate, whereas this is not so with the additives of the prior art.

For further evaluations of the VMA's of the invention, control stocks based on non-oil-extended SBR rubber or SBR/natural rubber mixtures, and having the following compositions were prepared. The figures indicate parts by weight.

|  | Stock | |
| --- | --- | --- |
|  | A | B |
| SBR 1500 | 100 | 50 |
| SMR 20 | — | 50 |
| N 347 carbon black | — | 55 |
| N 375 carbon black | 50 | — |
| Zinc oxide | 4 | 5 |
| Stearic Acid | 1 | 2 |
| Antiozonant[1] | 2 | — |
| Antioxidant[2] | — | 1 |
| Process oil | 8 | — |
| Circolight RPO | — | 6 |
| Sulphur | 2 | 2 |
| Accelerator[3] | 1.2 | 1 |

[1]N-1,3-dimethylbutyl-N'-phenyl-p-phenylenediamine
[2]Polymerised 1,2-dihydro-2,2,4-trimethylquinoline
[3]N-Cyclohexylbenzothiazole-2-sulphenamide.

Test stocks were prepared by mixing 1, 2 and 3 parts by weight respectively of VMA No. 2 of Table 1 above, into portions of the Control Stock A per 100 parts by weight of rubber. The test stocks and a control without VMA were vulcanised by heating at 153° C. for time $t'_c(90)$- see ISO 3417-1977(E). Measurements of the physical properties of the vulcanisates by standard methods showed that the presence of the VMA had a generally beneficial effect on modulus but was substantially without effect, relative to the control, on hardness and resilience. However, a significantly beneficial effect on compression set (Method ISO 815-1972(E)) was noted, the percentages measured after 22 hours at 70° C. being 34 for the control, and 29.5, 29 and 27 for the stocks containing respectively 1, 2 and 3 parts by

TABLE 3

| | Mooney ML (1 + 4) 100° C. | | | | Rebound | | | | Stress at 100% | |
| --- | --- | --- | --- | --- | --- | --- | --- | --- | --- | --- |
| | Mooney Units | | Mooney t5 | | Resilience | | Hardness | | Elongation | |
| | | (Rel) | Min. | (Rel) | % | (Rel) | IRHD | (Rel) | MPa | (Rel) |
| 11 | 75.6 | (100) | 17.7 | (100) | 61.5 | (100) | 72 | (100) | 3.4 | (100) |
| 12 | 70.0 | (93) | 17.4 | (98) | 61.5 | (100) | 76 | (106) | 4.2 | (124) |
| 13 | 67.9 | (90) | 16.7 | (94) | 62.2 | (101) | 76 | (106) | 3.8 | (112) |
| 14 | 68.1 | (90) | 15.0 | (85) | 62.2 | (101) | 70 | (97) | 2.8 | (82) |
| 15 | 71.0 | (94) | 15.6 | (88) | 58.1 | (94) | 74 | (103) | 3.3 | (97) |

Resilience, hardness and stress at 100% elongation were measured by standard methods. (Resilience and hardness as above, Tensile tests ISO 37-1977(E).) Comparison of Stocks 12 and 13 with Stocks 14 and 15 shows that the prior art additives reduce the induction period of the stock before the onset of cure (Mooney t5 values) more than the VMA's of the invention. The same comparison shows that while the VMA's of the invention give stocks having higher values of the stress weight of the VMA per 100 parts by weight of rubber.

A test stock was prepared by mixing 3 parts by weight of VMA No. 2 of Table 1 with a sample of Control Stock B per 100 parts by weight of rubber. Portions of the test stock and the control were vulcanised by heating at 141° C. for a time $t'_c(90)$. Measurements of the physical properties of the vulcanisates by standard methods showed a slight improvement for the test stock in 100% Modulus (3.6 MPa compared with 3.2 MPa) and elongation at break (440% compared with 463%). There were, however, significant improvements in compression set after 22 hours at 70° C. (20% compared with 35% for the control) and in blow-out time on the Goodrich Flexometer, ASTM 623-1978, Method A, (19 minutes compared with 11 minutes for the control).

What is claimed is:

1. A rubber composition comprising an unvulcanised rubber polymer and, as a viscosity modifying additive, an alkylthioalkanoic acid, salt or ester having the formula $$R^1S(CR^3R^4)_xCO_2R^2$$

where $R^1$ represents an alkyl group or a hydroxy- or alkoxy-substituted alkyl group, said group containing (apart from the alkoxy carbon atoms in an alkoxy-substituted alkyl group) from 4 to 22 carbon atoms, $R^2$ represents hydrogen, a metallic or other cationic group, or an esterifying group, each of $R^3$ and $R^4$ represents independently hydrogen or an alkyl group, and x has a value of from 1 to 10.

2. A composition according to claim 1 wherein, in the formula of the viscosity modifying additive, $R^1$ represents an alkyl group of from 8 to 18 carbon atoms, each $R^3$ and each $R^4$ independently represents hydrogen or a methyl or ethyl group and x has a value of from 1 to 4.

3. A composition according to claim 2 wherein, in the formula of the viscosity modifying additive, $R^1$ represents a straight chain alkyl group of from 10 to 16 carbon atoms, each of $R^3$ represents hydrogen, $R^4$ represents hydrogen or a methyl group, and x has a value of 1 or 2.

4. A composition according to claim 1 wherein, in the formula of the viscosity modifying additive, $R^2$ represents hydrogen or an equivalent of zinc.

5. A composition according to claim 3 wherein the viscosity modifying additive is n-dodecylthioacetic acid.

6. A composition according to claim 1 wherein the amount of viscosity modifying additive is from 1 to 5 parts by weight per 100 parts by weight of rubber.

7. A composition according to claim 1 wherein the rubber polymer comprises cis-polyisoprene, styrene-butadiene or nitrile rubber or a blend of any such rubber with polybutadiene.

8. A composition according to claim 7 wherein the rubber is natural rubber.

9. A composition according to claim 7 wherein the rubber polymer is a styrene-butadiene rubber or a blend of natural rubber and styrene-butadiene rubber.

10. A composition according to claim 1 which contains a filler, vulcanising agent and other ingredients for use in the production of a fully compounded rubber stock.

11. A method of improving the processability of rubber, which comprises incorporating into unvulcanised rubber a viscosity modifying agent as defined in claim 1.

12. A vulcanisate which has been obtained by heating to vulcanisation temperature a composition as defined in claim 10.

* * * * *